Jan. 12, 1971 F. C. MARTIN, JR 3,555,522

LOADING LOGIC CIRCUITRY FOR DELTIC MEMORY

Filed Jan. 3, 1968 2 Sheets-Sheet 1

INVENTOR,
FRANCIS C. MARTIN, JR.

BY Strauch, Nolan, Neale, Nies & Kurz
ATTORNEYS

INVENTOR,
FRANCIS C. MARTIN, JR.
BY Strauch, Nolan, Neale, Nies & Kurz
ATTORNEYS

3,555,522
LOADING LOGIC CIRCUITRY FOR DELTIC MEMORY

Francis C. Martin, Jr., San Diego, Calif., assignor, by mesne assignments, to Ametek, Inc., New York, N.Y., a corporation of Delaware Filed Jan. 3, 1968, Ser. No. 695,512
Int. Cl. G11c *21/00*
U.S. Cl. 340—173 9 Claims

ABSTRACT OF THE DISCLOSURE

Loading circuitry for the asynchronous sampling of analog information and the insertion of data pulses so derived into a Deltic (Delay Line Time Compressor) memory having a given data recirculation period and a recirculation rate fixed by an internal clock frequency. The analog data is periodically sampled at any desired rate and time completely independently of and in asynchronism with the given recirculation rate of the Deltic memory. Subsequent to each asynchronous sampling operation, the data pulse so provided is then synchronized with respect to the internal clock of the Deltic memory, stored, and inserted into the Deltic memory recirculation loop at a proper time interval.

Figure 1:
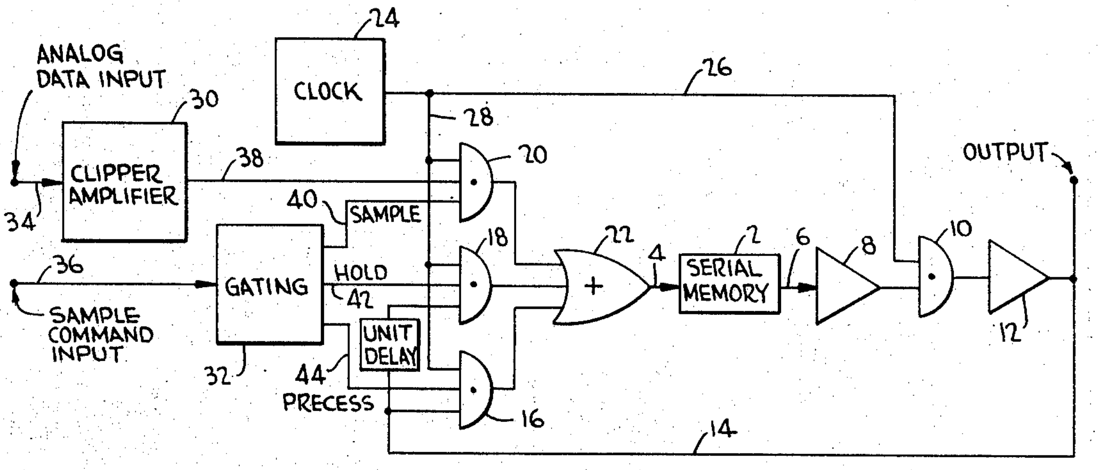

The loading circuitry of the instant invention accordingly allows external analog data to be sampled at virtually any time and at any rate up to twice the recirculation rate of the Deltic memory in a manner completely independent from the recirculation rate of the Deltic memory, thus increasing the utility of a Deltic system. Yet, the loading circuitry of the instant invention ensures that the actual insertion of the thus sampled data takes place at the desired time interval of the recirculation period.

This invention generally relates to loading logic circuitry and specifically concerns loading logic circuitry for sampling and inserting external data into the recirculating loop of a Deltic memory.

Deltic memories (Delay Line Time Compressors) are known and used in the art and generally consist of a serial digital memory in which digital data can be continuously recirculated at a high frequency rate. Normally, the digital data within the recirculating memory is derived in the form of digital "1's" and "0's" from a source of external data, the external data being gated into the recirculating memory or Deltic at a relatively low rate such as 4,000 samples per second or less. In contrast to the input rate, the recirculation rate of the Deltic memory can be as high as 20,000,000 samples per second. Thus, external data taken or sampled over a relatively long period of time can be inserted into the recirculating memory of the Deltic to be stored and be read out from the recirculating loop thereof at a very high rate of speed during an extremely short period of time. The Deltic memory accordingly does, in fact, serve to "compress" the time period during which a plurality of external data samples were taken. Such Deltics are widely employed in a variety of environments and utilized in conjunction with any number of cross-correlation, auto-correlation, and frequency spectrum analyzer equipment.

In spite of the general utility of a Deltic memory in making possible high frequency manipulation techniques of low frequency or low repetition rate input data, a major disadvantage still exists in known systems. Specifically, the disadvantage relates to the input or loading circuitry associated with the Deltic memory in that the sampling rate of the external data information was necessarily "slaved" to or made wholly dependent upon the recirculating rate of the Deltic memory itself. Thus, with the prior art arrangements, external data samples could only be taken at certain time intervals in actual synchronism with the recirculation period of the Deltic recirculating serial loop. This restraint on the acceptable time of occurrence of the sampling periods of Deltic systems quite naturally inhibits the use of the Deltic equipment and technique when attempting to analyze and sample certain varieties of external data. Obviously, when the external data sampling rate and period are "slaved" to the recirculation rate and period of the Deltic loop, sampling of external data that occur irregularly in time and not in synchronism with the recirculation period of the Deltic for one cannot be achieved.

Thus, it is the primary object of the subject invention to provide loading logic circuitry for a Deltic memory which overcomes all the disadvantages of the prior art.

Another and more specific object of the subject invention is to provide loading logic circuitry for a Deltic memory which enables sampling of an external source of data at a rate completely independent of and asynchronous to the recirculation rate of the Deltic loop.

It is another object of the subject invention to provide loading logic circuitry for a Deltic memory which enables asynchronous sampling of external data information at a rate up to two or more times the recirculation rate of the Deltic loop, whereby the samples taken are temporarily stored for later synchronous use.

The above and other objects of the subject invention are implemented by the novel loading logic circuitry described herein for use with a Deltic recirculating loop memory. The inventive loading logic circuitry serves a primary function of deriving a digital input for a recirculating serial memory containing a train of digital bits from a periodic sampling of an external source of data information, wherein the sampling rate of the external data information is completely independent from the recirculation rate of the recirculating serial memory and can take place either zero or up to two or more times during each recirculation period of the Deltic. In this respect, sampling means are provided for producing digital data pulses from an external analog source of data information, the data pulses having either a value of "1" or a value of "0" depending on the magnitude of the analog input. A sampling pulse associated with each data pulse also is produced by the sampling means during each sampling period, the sampling pulse being indicative only of the occurrence of a sampling period.

The data pulse and the sampling pulse so produced during each sampling period are transferred to a first digital storage means wherein both pulses are temporarily stored pending the arrival of an internal clock pulse from the Deltic recirculating memory. Upon the occurrence of the internal clock pulse, both the data pulse and the sampling pulse are synchronously transferred with respect to the clock pulse into a second digital storage means. At this point, the data pulse and sampling pulse originally obtained by an asynchronous sampling of external data information are synchronously transferred, timed and stored with respect to the Deltic recirculating memory.

Near the end of each recirculation period of the Deltic memory, the data pulse and the sampling pulse associated therewith are transferred to a recirculation control mechanism wherein the data information represented by the data pulse is inserted into the recirculating loop in the place of the oldest digital bit of information therein, and wherein the information concerning the number of samples taken as represented by the sampling pulse is utilized to precess in time the train of digital bits in the recirculating serial memory in preparation for the next recirculating period.

The second digital storage means and the recirculation control mechanism are preferably constructed such that up to two data pulses and two associated sampling pulses can be stored and utilized during each recirculation period of the Deltic recirculating loop. If, during a single recirculation period of the Deltic memory, only one data pulse and one associated sampling pulse is produced, then, as mentioned above, the oldest digital bit in the train of digital bits within the recirculating loop is dropped and the single new data pulse is inserted in its place, the single sampling pulse serving to precess the recirculating train of digital bits in the Deltic by one count. If, on the other hand, two data pulses and two sampling pulses associated therewith are produced during a single recirculation period of the Deltic memory, then, the two oldest digital bits in the train of recirculating digital bits in the Deltic are deleted and the two data pulses produced are inserted in their place, the two sampling pulses serving to precess the recirculating train of digital bits by two counts in preparation for the next recirculation period. Finally, if during a particular recirculation period of the Deltic, no sampling of the external data occurs, then, the inventive loading logic circuitry is such that no precession of the digital train takes place in the recirculating memory and the Deltic is held in a "hold" mode.

As is apparent, through the utilization of the novel loading circuitry of the subject invention, external data information can be sampled at a rate that is wholly asynchronous with the recirculation rate of the Deltic memory, then stored, and finally inserted into the recirculating train of digital bits of the Deltic during a synchronous or proper time interval.

Figure 2:
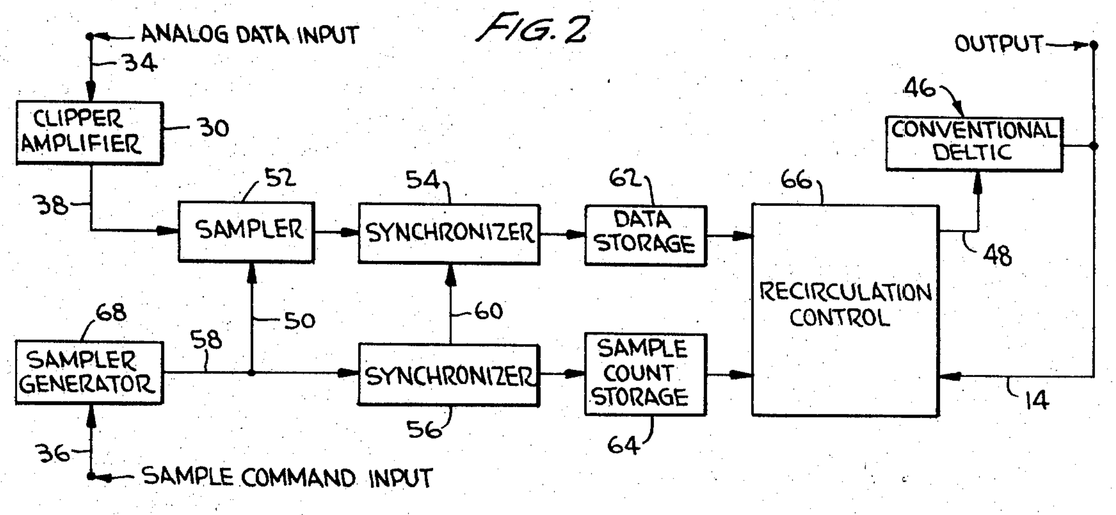
Figure 3:
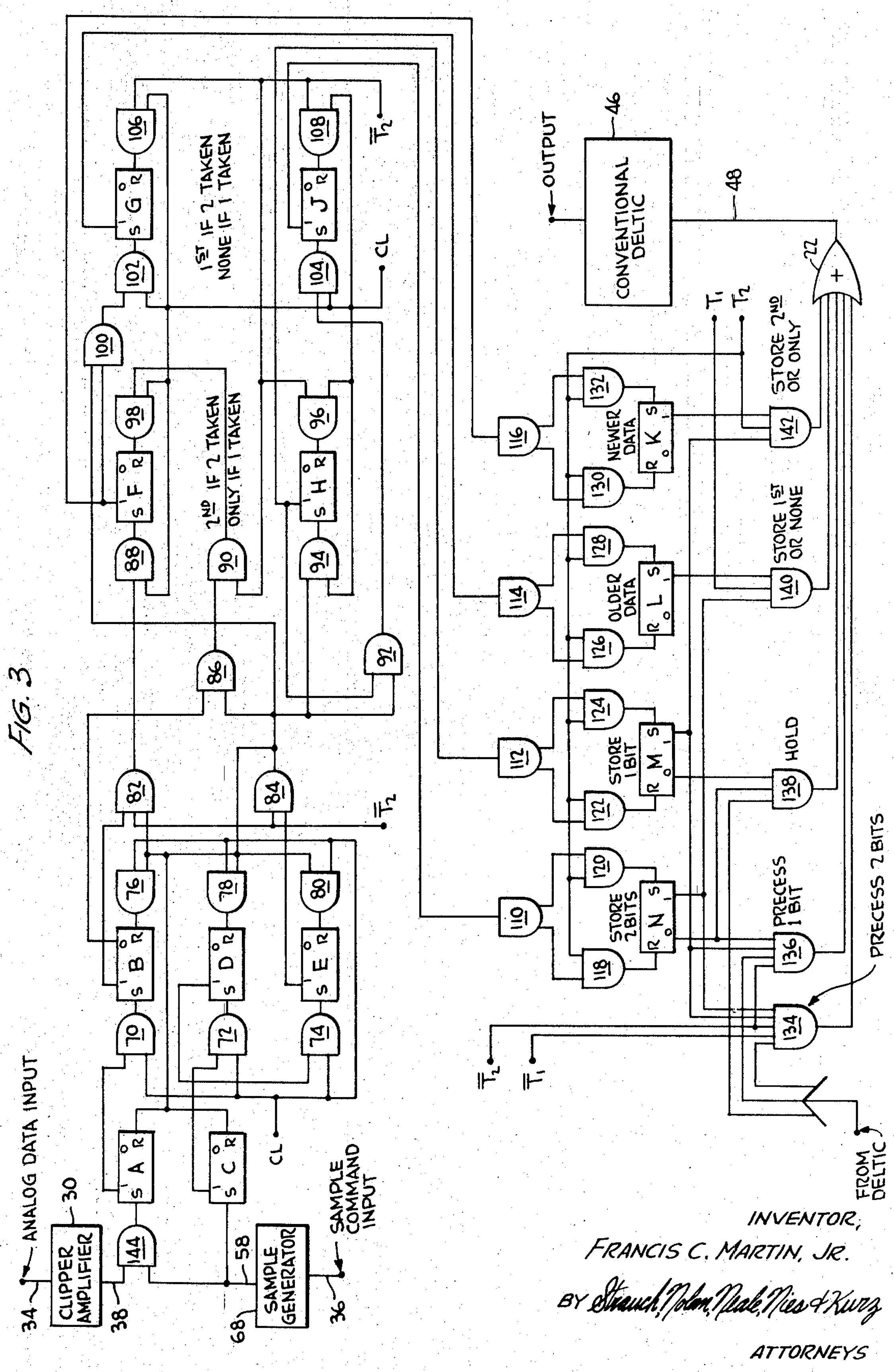

The invention will be better understood and additional features and objects thereof will become more readily apparent when reference is given to the following detailed description thereof in conjunction with the appended drawings wherein:

FIG. 1 is a functional block diagram of a conventional Deltic recirculating memory depicting the utilization of loading logic circuitry input requiring the prior art synchronous external data sampling technique;

FIG. 2 is a functional block diagram in accordance with the subject invention of loading logic circuitry for the insertion of data into a conventional Deltic recirculating memory, the loading logic circuitry enabling a plurality of asynchronous samplings of an external analog data source during each Deltic recirculation period; and, FIG. 3 is a circuit schematic diagram depicting the placement of logic circuit components in a preferred embodiment of the subject invention.

Reference is made to FIG. 1 wherein there is depicted a functional block diagram showing the general configuration of a conventional Deltic recirculating loop memory. The input circuitry associated therewith is constrained for operation such that sampling of external analog data must take place synchronously with respect to the recirculation rate of the Deltic memory itself. A description of the operation of this conventional Deltic system will serve to facilitate an understanding and appreciation of the advantages associated with the novel invention.

The conventional Deltic system of FIG. 1 comprises as its memory storage element, a serial memory 2 having a specified digital "length" in which is stored a train of digital information bits. This train of digital bits is caused to continuously recirculate during a given recirculation period and at a rate derived from the frequency of clock 24 which, via timing lines 28 and 26, serves to advance the train of digital bits in serial memory 2 one bit at a time until a recirculation cycle has been completed. The advancing digital bits within the serial memory 2 are read out, one at a time, in synchronism with clock 24, at the output 6 of the serial memory 2, and are then amplified by output amplifier 8, re-clocked through "AND" gate 10, amplified once again by driver amplifier 12, and then caused to recirculate via the "feedback" or external recirculation loop 14 to one of the inputs, as shown, of the "hold" "AND" gate 18, for example. Again, in synchronism with clock pulses on line 28, and in synchronism with an applied output 42, for example, from the logic circuit gating means 32, each digital bit read out from the serial memory 2 is caused to re-enter the serial memory through "AND" gate 18 and "OR" gate 22 back to the input 4 of the serial memory 2. Thus, the basic system is such that the train of digital bits within the serial memory 2 continuously recirculate via the external recirculation loop 14 from the output 6 of the serial memory back to the input 4 of the same. As long as no external data samples are taken for insertion into the recirculating train of digital bits, the operation of the Deltic remains in this "hold" mode. Once during each recirculation period of the serial memory 2 and in synchronism with pulses from the internal clock 24, a complete cycle or recirculation of the train of digital pulses or bits within the serial memory 2 takes place, As an example for gaining a further understanding of a Deltic system, if serial memory 2 had a "length" such that it contained 1,000 bits of digital information, each bit being respectively numbered 1 through 1,000, then, once during each recirculation period when the Deltic is in a "hold" mode, bit No. 1 would appear at the input of "AND" gate 18.

The train of digital bits within the serial memory 2 might, for example, represent stored external information taken over a relatively long period of time with respect to the recirculation period of the serial memory 2. Such external data would have been previously inserted into the serial memory 2 in a successive manner, wherein if the "length" of the memory was 1000 bits, digital bit 1 of the train of digital bits would represent the oldest information in the serial memory and bit No. 1,000 of the train of digital bits would represent the newest bit of digital information. If additional new samples of the current external analog information are desired to be stored to "update" the information contained within the serial memory 2, the Deltic would be placed in a "sample" mode and the oldest bit or, in this case, bit No. 1 of the train of digital bits within the serial memory 2, would be deleted and a new digital bit, for example, bit No. 1,001 derived from the current analog input information would be inserted in its place. Thus, on the next subsequent recirculation periods, bit No. 2 would now be the oldest bit of digital information.

The "updating" of the information within the serial memory 2 when the Deltic is in a "sample" mode, is accomplished by a synchronous sampling of the external analog data in the following manner. The external analog data is applied to the analog data input 34 and is amplified by clipper amplifier 30 to produce at the output 38 thereof, a digital pulse comprising either a "1" or "0" dependent upon the magnitude of the signal impressed on the analog data input 34. Once during each recirculation period of the serial memory 2, a sample command input would be provided on line 36 which would cause the "sample" output 40 and "precess" output 44 of the gating means 32 respectively leading to "AND" gates 20 and 16 to become energized at a predetermined interval during the recirculation period. Specifically, upon the occurrence of a "sample command" input on line 36, the "sample" output 40 from the gating means 32 would become energized immediately after the newest digital bit within the train of digital bits in serial memory 2 had completed its recirculation and the oldest digital bit was attempting to re-enter the serial memory 2 via gate 18. Energization of the "sample" output 40 would be coupled with a de-energization of the "hold" output 42 which would serve to close "AND" gate 18 and thus block and delete the oldest digital bit from re-entering the serial memory 2 via the external circulation loop 14. During the period at which time the oldest digital bit is prevented from re-entering the serial memory 2, "AND" gate 20, is activated by a pulse from clock 24 on line 28 and by the energization of the "sample" output 40 thus allowing a new sampled data pulse that may be present on line 38 at that time to enter into the serial memory 2 via the "OR" gate 22 and the input 4 in place of the deleted oldest digital bit.

Since, during the next sampling period of the Deltic system, it would be desired to delete the next oldest bit of the train of digital bits within the serial memory 2 and substitute therefor a new sampled data pulse, the entire train of digital bits within serial memory 2 must be precessed, that is, set back by one clock count in time. Thus, at the end of each recirculation cycle, the newly added digital pulse or bit would become the last digital bit in the train, with the now oldest digital bit of the serial memory thus being brought to the "head" of the recirculating line. This precession of the train of digital bits by one count is accomplished via the "precess" input to "AND" gate 16, the "precess" input and "AND" gate 16 having associated therewith an external delay of one count. Accordingly, during the next succeeding recirculation period after the circulation period wherein a new bit of digital information has been added to the train, the entire train of digital information within serial memory 2, will be "delayed" or precessed by one count. Now, if another new bit of digital information is present, then, in the same manner discussed above, the oldest digital bit in the serial memory would be deleted, the new bit derived from the current analog data input on line 34 being substituted in its place, and the entire train of digital bits being again precessed by one count to make ready for the next recirculation period and substitution of new data for old.

As is apparent from the above description, sampling of the external analog data to produce a data pulse and insertion of same into the train of digital bits within serial memory 2 in place of the oldest bit in the train must take place synchronously with the internal clock 24 and with the recirculation period of the Deltic. Accordingly, the occurrence of a "sample command" input on line 36 would be wholly dependent upon the recirculation rate of the serial memory 2 and could only take place at a specified time during the recirculation period thereof, that is, at a time when the serial memory 2 is in a position to reject the oldest data bit therein and to accept a new sample. However, if, at this predetermined time interval during a recirculation period, no external analog signal is present, or if the external analog signal has already occurred just prior to this predetermined interval or, alternatively, will occur just after the same, then no new information can be derived or inserted. Thus, the analog signal occurring at an asynchronous time period would, in effect, be lost. Thus, the operation of the Deltic of FIG. 1 is such that the input loading circuitry thereof is wholly "slaved" to the recirculation rate of the serial memory 2. As stated above, such "slaving" and synchronous requirements on the loading logic circuitry severely limit the usefulness of the Deltic memory itself.

Turning now to FIG. 2, a block diagram of loading logic circuitry constructed in accordance with the subject invention is depicted. The loading logic circuitry is such that, unlike the circuitry of FIG. 1, sampling of the external analog data can take place at virtually any time entirely independently from the recirculation rate of the Deltic serial memory. A conventional Deltic generally designated 46 is provided, the Deltic containing a serial memory 2, an "OR" gate 22, amplifiers 8 and 12, "AND" gate 10 and internal clock 24 such as depicted in the representation of FIG. 1. An external loop 14 is also provided for the conventional Deltic 46 wherein digital bits from the train of digital bits within the serial memory are read out and recirculated one at a time via the external recirculation loop 14 through a recirculation control 66 of the subject invention and back through the input 48 of the conventional Deltic. As long as no new samples are taken of the external analog data, the train of digital bits within the conventional Deltic 46 continually recirculates in the manner described above, with no precession in time or deletion of bits taking place. In other words, in the absence of analog input samples, the conventional Deltic 46 is retained in its "hold" mode by the recirculation control 66 and, in consequence thereof, the train of digital bits representing information data within the serial memory is held indefinitely in a fixed reference time plane with respect to the system clock.

During the continuous recirculation of the train of digital bits within the Deltic memory 46, a source of external analog information can be continually monitored and applied to the analog data input 34 of clipper amplifier 30, the output 38 of which provides in a fashion similar to that of FIG. 1, a data pulse having either a digital "1" or "0" value. The data pulse appearing on clipper amplifier output line 38, however, is not directly applied the the recirculation control 66 and inserted into the train of digital bits as was the case in the conventional system of FIG. 1. Rather, the data pulse that may be present on line 38 cannot pass through the loading logic circuitry until sampler gate 52 is first opened by a sampling pulse generated by sampler generator 68 in response to a "sample command" input on line 36. The "sample command" input can be given to the sampler generator 68 at virtually any time wholly independently from and asynchronously with respect to the recirculation rate of the conventional Deltic 46. During usual operation of the Deltic system, sample pulses from the sample generator will almost always occur out of synchronization with respect to the internal clock or recirculation rate. Again, this type operation is directly contrasted to that described with respect to the synchronous constraints on the "sample command" input of the system of FIG. 1.

When sampler generator 68 is given a "sample command" input 36, the output 58 of the sampler generator is applied via line 50 to sampler 52, whereby sampler 52 is "opened" allowing a data pulse that may be present on line 38 to pass into the synchronizer 54. The sampling pulse on output 58 from the sampler generator 68, in addition to "opening" the sampler gate 52, also passes into a further synchronizer 56 which is coupled, via line 60, to the synchronizer 54. Thus, the loading logic circuitry as so far described is operative to sample an external source of analog data at any time as determined by a desired sampling rate within the sampler generator 68, each data sample thus produced being temporarily placed in synchronizer 54, whereas each actual sample generator output or sampling pulse on line 58 is temporarily placed in synchronizer 56.

It is the function of the two synchronizers 54 and 56 to accept the resulting data from the sampler and from the sample generator and to convert these respectively to one and only one pulse of information in synchronism with the internal clock frequency of the Deltic memory. These two synchronizers may be set at any instant as dictated by the sample generator. Internally, they may remain in the one state for a number of clock pulses but they will only allow a single clock pulse to be respectively emitted to the data storage and sample count storage for each input accepted, as will be discussed below.

When a clock pulse occurs by operation of the internal clock 24 within the conventional Deltic 46, both the data pulse within synchronizer 54 and the sample pulse associated therewith within the synchronizer 56 are respectively transferred or emitted to the data storage means 62 and to the sample count storage means 64 respectively where they remain pending their subsequent transfer into the recirculation control 66. It is the function of the sample count storage means 64 to accept one pulse for each count occurring within a given recirculation period of the Deltic, since the Deltic can only be entered at the record gap between the oldest and the newest data in the line. The sample count storage means preferably has a storage capability equal to the maximum number of samples which can occur during a recirculation period. If no samples have occurred during a recirculation period, the count in this storage means is zero. If one sample has taken place, one count is shown in the register. If two samples have been taken during a recirculation period there will be two counts in the sample count storage means. In a similar manner, the data storage means 62 must hold the record of the state of the clipper amplifier 30 and sampler 52, that is the value of the data pulse provided for each sample generated. The data pulses are stored in a particular order since the oldest data pulse, in the event that more than one sample is taken per recirculation period, must be entered last in the Deltic recirculating loop in accordance with the preferred embodiment. The recirculation control 66 provides the sample, hold and precess functions as described with respect to the system of FIG. 1.

The recirculation control 66 examines the number of counts taken during a previous recirculation period of the Deltic and adjusts or precesses the length of the Deltic loop to allow for the elimination of the oldest data bit in the recirculating line so as to make room for a new data pulse. If no samples are taken during a particular recirculation period, the Deltic is held in the "hold" mode as discussed above, wherein no precession of the train of digital bits takes place within the recirculating memory, and data is held in a constant location within the line with respect to the end of a record gap between the oldest and newest stored data. If one sample has occurred during a recirculation period, the recirculation control 66 retards all data within the Deltic loop, thus dropping off the oldest bit in the recirculating loop and substituting at the head end of the train, the new data resulting from the most recent sample. In the event that two samples were taken during a recirculation period, the data train must be precessed by two bits, thus retarding the data in the recirculating loop by two clock pulses, dropping the two oldest bits therein, and substituting at the head end of the train, the two newly acquired data pulses or bits making sure that the older of the two data pulses is entered into the memory last.

The actual preferred logic circuitry utilized to perform the functions described with respect to the functional block diagram of FIG. 2 is illustrated in the preferred embodiment of FIG. 3. Initially, it is assumed that the serial memory within the conventional Deltic 46 has been loaded and contains a complete train of digital bits of information which, in the absence of a new sample of data information, continuously recirculate in a fixed time reference plane, from the conventional Deltic 46 through the output thereof to the "from Deltic" input to the gating circuitry, through the "hold" "AND" gate 138, the "OR" gate 22, and back into the input 48 of the Deltic memory.

However, when sampling of the external source of analog data occurs, the operation of the logic circuitry depicted and its effect upon the train of digital bits within the conventional Deltic 46 is as follows. The analog data is continuously entered via the analog data input 34 through clipper amplifier 30, wherein the analog data is transformed into a data pulse on output line 38 of the clipper amplifier 30, the data pulse having a value of either "1" or "0." The data pulse, however, is prohibited from entering the logic circuitry of the subject invention by the blocking action of "AND" gate 144. When a sampling pulse is produced at output 58 of sample generator 68 in response to a "sample command" input on line 36 thereof, the sampling pulse has the effect of setting flip-flop C into the set or "1" state, and serves to pass the data pulse on line 38 through the "AND" gate 144 to thus set flip-flop A in the "1" position if the value of the data pulse on line 38 was "one," and serves to leave flip-flop A in the reset or "0" condition if the value of the data pulse on line 38 was zero. Thus, flip-flop C is always set with the generation of a sampling pulse on line 58, whereas flip-flop A may or may not be set depending on whether the data pulse from the clipper amplifier 30 is a logic "1" or a logic "0."

After flip-flop C is set, flip-flop D will be set on the next succeeding internal clock pulse via "AND" gate 72 whereas flip-flop B may, or may not, be set via "AND" gate 70 depending on the state of flip-flop A. Flip-flops B, D and E serve to provide a temporary storage for both the data pulse derived from the external source of analog data and for the sampling pulse derived from the sample generator 68. In addition, flip-flops B, D and E, in the manner to be described, serve to synchronize the transfer of the value of the data pulse and the sampling pulse into storage flip-flops F, G, H, and J in synchronism with an internal clock pulse and thus in synchronism with the recirculation rate of the Deltic memory.

When flip-flop D is set, flip-flop E will be set on the next succeeding clock pulse via "AND" gate 74. When flip-flop E is set, flip-flops B, D and E will all receive a reset command by action of the internal clock CL through "AND" gates 76, 78 and 80, and the information stored therein will be transferred via "AND" gates 82 and 84 into flip-flops F, G, H and J. Flip-flops B, D and E will receive the reset command as described except during the period T2 which is at the instant that loading into flip-flops F, G, H and J is taking place. This possible delay in the resetting of flip-flops B, D and E is required so that the contents of flip-flops B and D may not be modified while a transfer of information is taking place.

Accordingly, the output of flip-flop E is passed through "AND" gate 84 to provide one input for each of the "AND" gates 86, 92, 94 and 100. As will be appreciated, each output of flip-flop E and consequently the output from "AND" gate 84 is representative of the receipt of a single sampling pulse from the sample generator 68. Each output from flip-flop B which contains stored information representative of the value of the data pulse received from the clipper amplifier 30 during each sampling period, is fed, depending upon the "1" or the "0" state of flip-flop B, through "AND" gates 82 or 86, the output of "AND" gate 82 being connected to one input of "AND" gate 88 leading to flip-flop F. If no sample pulses have been received during a particular recirculation period of the Deltic memory, both flip-flops H and J comprising the sample count storage means will thus remain in the reset or "0" state. However, the first such sampling pulse produced during a recirculation period will be fed into the set side of flip-flop H. It is here that memory is provided that at least one sample has been taken during a recirculation period of the Deltic memory. If a second such sampling is taken during a given recirculation period, the second sampling pulse is allowed to enter through "AND" gate 104 and thus also set flip-flop J. In this manner, if no samples were taken during a given recirculation period, both flip-flops H and J will remain reset at the end of the recirculation period. If one sample was taken, flip-flop H only will be set and if two samples were taken, both flip-flops H and J will be set.

Flip-flops F and G, comprising data pulse storage means for the data pulses derived during the sampling periods, work in a similar but not identical manner to the operations of flip-flops H and J. If one sample was taken during a recirculation period of the Deltic memory, the state of the logic information of the external analog data source during the one sample period as represented by the data pulse will remain in flip-flop F. If two samples in one recirculation period of the Deltic memory are taken, the information or data pulse from the first sample period which was stored in flip-flop F will be transferred to the second flip-flop G through the effect and operation of "AND" gates 100 and 102. The information or data pulse derived during the second sample of a given recirculation period will then be stored in flip-flop F. In this manner, if no samples were taken during a recirculation period, both flip-flops F and G will remain in their "0", or reset state. If one sample is taken during a recirculation period, the state of the data, that is, the data pulse having a value of either a logic "1" or "0" will remain in the memory of flip-flop F. If two samples are taken per recirculation period, the older data, that is, the first taken sample or data pulse, will be "remembered" in flip-flop G and the newer information, that is, the second sample or data pulse, will remain in flip-flop F.

Near the instant that a recirculation period of the Deltic recirculating memory is completed, the contents of flip-flops F and G containing stored information in accordance with the digital value of the external sampled analog data, and the contents of flip-flops H and J representing stored sampling pulse information indicative of the actual number of samples taken during a recirculation period, are transferred to flip-flops K and L, and M and N, respectively. Such transfer takes place through the action of amplifiers 110, 112, 114 and 116, which provide respective inputs to the various "AND" gates 118, 120, 122, 124, 126, 128, 130 and 132, serving to place the flip-flops K, L, M and N into the same condition as the digital storage flip-flops F, G, H and J. The states of the four "memory" or digital storage flip-flops F, G, H and J are thus transferred into the flip-flops K, L, M and N and are thus preserved for the control of the loading process and insertion of new data for one complete recirculation period of the Deltic memory. After transfer of the information, flip-flops F, G, H and J are reset by action of the clock pulses CL and $\overline{T}_2$ through gates 90, 96, 98, 106, and 108. Accordingly, flip-flops M and N would now contain logic information regarding the actual number of samples taken during a recirculation period of the Deltic memory and, through the interconnection with "AND" gates 134, 136 and 138, serve to open appropriate ones of these gates to control the loading of memory 46. The Deltic will be caused to remain in the "hold" mode, wherein the output of the Deltic memory is transferred, without delay back into the input thereof, in the event that the states of both the M and N flip-flops are "0." If the M flip-flop contains a digital "1" but the N flip-flop contains a digital "0," gate 136 is activated to cause the delay line recirculation period to be delayed or precessed by one clock count. If both flip-flops M and N contain a logic "1," then "AND" gate 134 will be activated causing the recirculation period of the Deltic memory to be delayed or precessed by two clock pulses or bits.

When the Deltic memory 46 is maintained in the "hold" mode by actuation of "AND" gate 138, no new data is admitted into the Deltic recirculation loop, as described above. However, if one sample was taken during a recirculation period, this sample would be stored in flip-flop K, and the contents of flip-flop K would be allowed by gate 142 and signal $T_2$ to enter and replace the oldest, previously stored bit of the train of digital bits in the Deltic recirculation loop. If two samples were taken during the recirculation period, the contents of the L and K flip-flops in that order are allowed to enter the Deltic loop through sequential operation of gates 140 and 142. This replaces the two oldest bits in the Deltic recirculation loop under control of flip-flops M and N.

Thus, by virtue of the instant invention, either zero, one or two or more samples of external analog data can be taken asynchronously with the recirculation and period rate of a Deltic memory during each recirculation period thereof, these samples subsequently being completely synchronized with the operation of the Deltic and stored and finally inserted in the required fashion into the recirculating loop. This technique of asynchronously sampling can, of course, be extended to virtually any number of samples taken for recirculation period of the Deltic memory. For simplicity of description, however, an embodiment of the invention having a maximum capability of two samples per cycle has been described in detail.

From the above, it should be apparent that the objects set forth at the outset of this specification have been successfully achieved.

What is claimed is:

1. Loading circuitry for inserting data pulses into a Deltic memory having a given data recirculation period and a recirculation rate fixed by an internal clock frequency, said loading circuitry comprising:

data input means for accepting data information and providing data pulses in response thereto in asynchronism with respect to said given recirculation rate of said Deltic memory, said data input means comprises sampling means for sampling said data information and providing a data pulse indicative of said data information during each such sampling, said sampling means having a given sampliing period and rate for sampling said data information with said given sampling rate being independent of said recirculation rate of said Deltic memory, and said sampling means including a sample generator means for generating a separate sample pulse associated with said data pulse during each sampling period;

first synchronizing means for synchronizing with respect to said internal clock frequency at least one data pulse provided during a recirculation period of said Deltic memory;

first storage means for storing said at least one synchronized data pulse;

second synchronizing means for synchronizing with respect to said internal clock frequency at least one sample pulse provided during a recirculation period of said Deltic memory;

second storage means for storing said at least one synchronized sample pulse; and recirculation control means for inserting said at least one stored data pulse into said Deltic memory during a predetermined time interval of said recirculation period, said recirculation control means including means for determining the number of synchronized sample pulses stored in said second storage means during each recirculation period of said Deltic memory, and said recirculation control means including means for processing said Deltic memory in response to said number of sample pulses determined and inserting said associated data pulses stored in said first storage means into said Deltic memory.

2. A logic circuit for providing a digital input to a recirculating serial memory containing a train of digital bits, said digital input being derived from a periodic sampling of an external source of data information, the sampling rate being independent of a clock pulse controlled recirculation rate of said serial memory, said logic circuit comprising in combination:

sampling means for sampling said external source of data information asynchronously with respect to said recirculation rate of said serial memory, said sampling means producing one data pulse indicative of said external data information and one sampling pulse indicative of the occurrence of a sample during each sampling period;

first digital storage means for storing said data pulse and said sampling pulse;

second digital storage means;

transfer means for monitoring the presence in said first digital storage means of said data pulse and said sampling pulse during each recirculation period of said recirculating serial memory and for transferring each such monitored data pulse and sample pulse from said first digital storage means into said second digital storage means in synchronism with a clock pulse, said transfer means clearing said first digital storage means;

precessing means for precessing said train of digital bits in said recirculating serial memory in accordance with the number of stored sampling pulses in said second digital storage means during a predetermined time interval of each recirculation period of said serial memory, said precessing means deleting a number of digital bits from said train of digital bits equal to said number of stored sampling pulses in said second digital storage means; and, data insertion means for inserting into said recirculating serial memory stored data pulses from said second digital storage means, said stored data pulses being substituted for said deleted number of digital bits.

3. A logic circuit as defined in claim 2, wherein said first digital storage means comprises a first pair of binary flip-flops, one flip-flop of said first pair being adapted to receive said data pulses, the other flip-flop of said first pair being adapted to receive said sampling pulses; a second pair of binary flip-flops; and first gating means responsive to a first clock pulse for transferring a data pulse from said one flip-flop of said first pair to one flip-flop of said second pair and for transferring a sampling pulse from said other flip-flop of said first pair to the other flip-flop of said second pair.

4. A logic circuit as defined in claim 3, wherein said second digital storage means comprises a group of first and second binary flip-flops adapted to receive data pulses from said one flip-flop of said second pair and a group of third and fourth binary flip-flops adapted to receive sampling pulses from said other flip-flop of said second pair.

5. A logic circuit as defined in claim 4, wherein said transfer means comprises a binary switch having an output responsive to a sampling pulse received by said other flip-flop of said second pair of flip-flops, and second gating means responsive to the simultaneous presence of said binary switch output and a second clock pulse to deliver a data pulse from said one flip-flop of said second pair in said first digital storage means to said first binary flip-flop of said second digital storage means and to deliver a sampling pulse from said other flip-flop of said second pair in said first digital storage means to said third binary flip-flop of said second digital storage means.

6. A logic circuit as defined in claim 5, wherein said transfer means further includes means for transferring the contents of said first binary flip-flop of said second digital storage means into said second binary flip-flop of said second digital storage means and for transferring the contents of said third binary flip-flop of said second digital storage means into said fourth binary flip-flop of said second digital storage means upon the occurrence of a second sampling pulse during a single recirculation period of said serial memory.

7. A logic circuit as defined in claim 6, wherein said precessing means precessess said train of digital bits and deletes one bit in response to a sampling signal only in said third binary flip-flop of said second digital storage means, and deletes two bits in response to a sampling signal in both said third and fourth binary flip-flops of said second digital storage means.

8. A logic circuit as defined in claim 7, wherein said data insertion means only inserts into said recirculating serial memory a data pulse in said first binary flip-flop of said second digital storage means when said precessing means deletes one bit, and successively inserts into said recirculating serial memory data pulses in said second and first binary flip-flops of said second digital storage means respectively, when said precessing means deletes two bits.

9. A logic circuit as defined in claim 8, wherein said precessing means and said data insertion means comprises a plurality of binary storage elements coupled in parallel to said first through fourth binary flip-flops of said second digital storage means, and logic elements coupling said plurality of binary storage elements to said recirculating serial memory.

References Cited

UNITED STATES PATENTS

| | | | |
|---|---|---|---|
| 3,262,102 | 7/1966 | Gabor | 340—172.5 |
| 3,302,176 | 1/1967 | McLaughlin | 340—172.5 |
| 3,387,284 | 6/1968 | Munson et al. | 340—173 |
| 3,414,887 | 12/1968 | Scantlin | 340—172.5 |

TERRELL W. FEARS, Primary Examiner

U.S. Cl. X.R.

340—172.5